United States Patent
Berry et al.

(10) Patent No.: US 8,893,511 B2
(45) Date of Patent: Nov. 25, 2014

(54) SYSTEMS AND METHODS FOR A GAS TURBINE COMBUSTOR HAVING A BLEED DUCT

(71) Applicant: General Electric Company, Schenectady, NY (US)

(72) Inventors: Jonathan Dwight Berry, Simpsonville, SC (US); Geoffrey David Myers, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 13/909,297

(22) Filed: Jun. 4, 2013

(65) Prior Publication Data

US 2013/0255273 A1    Oct. 3, 2013

Related U.S. Application Data

(63) Continuation of application No. 12/508,918, filed on Jul. 24, 2009, now Pat. No. 8,474,266.

(51) Int. Cl.

| | |
|---|---|
| F02C 6/08 | (2006.01) |
| F02C 9/52 | (2006.01) |
| F02C 9/54 | (2006.01) |
| F23R 3/10 | (2006.01) |
| F02C 7/22 | (2006.01) |
| F23R 3/26 | (2006.01) |
| F23R 3/00 | (2006.01) |

(52) U.S. Cl.
CPC ... *F02C 9/52* (2013.01); *F02C 9/54* (2013.01); *F23R 3/10* (2013.01); *F02C 7/222* (2013.01); *F23R 3/26* (2013.01); *F23R 3/005* (2013.01); *F23R 2900/03044* (2013.01)
USPC .................. 60/785; 60/751; 60/782

(58) Field of Classification Search
USPC .......... 60/262, 726, 751, 758, 760, 782, 785, 60/795, 796
See application file for complete search history.

(56) References Cited

U.S. PATENT DOCUMENTS 2,511,432 A * 6/1950 Feilden et al. ................... 60/796
4,098,073 A    7/1978 Adkins et al.
(Continued)

FOREIGN PATENT DOCUMENTS

CN    87101982 A    10/1987
CN    86105250 A    2/1988
(Continued)

OTHER PUBLICATIONS

Rudolph, et al., Innovative Design Features of the SGT5-8000H Turbine and Secondary Air System, Proceedings of ASME Turbo Expo 2009, Power for Land, Sea and Air, Jun. 8-12, 2009, Orlando, Florida, USA.

(Continued)

*Primary Examiner* — Phutthiwat Wongwian
*Assistant Examiner* — Michael B Mantyla
(74) *Attorney, Agent, or Firm* — Cantor Colburn LLP

(57) ABSTRACT

A gas turbine system includes a compressor operative to output an airstream and a diffuser having an inlet to receive the airstream and an outlet to output the airstream. The outlet has an area larger than the inlet to diffuse the airstream. The gas turbine system also includes a fuel nozzle operative to receive fuel and emit the fuel in a combustor and at least one bleed duct having an inlet between the compressor and the outlet of the diffuser. The at least one bleed duct is operative to direct bleed air from downstream of the compressor to the fuel nozzle.

16 Claims, 2 Drawing Sheets

(56) References Cited

U.S. PATENT DOCUMENTS

| | | |
|---|---|---|
| 4,275,857 A | 6/1981 | Bergsten |
| 4,297,842 A | 11/1981 | Gerhold et al. |
| 4,308,718 A | 1/1982 | Mowill |
| 4,353,205 A | 10/1982 | Cleary |
| 4,431,374 A | 2/1984 | Benstein et al. |
| 4,446,692 A | 5/1984 | Adkins |
| 4,459,802 A | 7/1984 | Mowill |
| 4,471,910 A | 9/1984 | de Paul et al. |
| 4,719,747 A | 1/1988 | Willkop |
| 4,719,748 A | 1/1988 | Davis, Jr. |
| 4,796,429 A | 1/1989 | Verdouw |
| 4,872,312 A | 10/1989 | Iizuka et al. |
| 4,901,520 A | 2/1990 | Kozak |
| 4,903,477 A | 2/1990 | Butt |
| 5,102,298 A | 4/1992 | Kreitmeier |
| 5,134,855 A | 8/1992 | Belcher et al. |
| 5,187,931 A | 2/1993 | Taylor |
| 5,257,906 A | 11/1993 | Gray et al. |
| 5,284,011 A | 2/1994 | Von Benken |
| 5,351,474 A | 10/1994 | Slocum |
| 5,394,687 A * | 3/1995 | Chen et al. .................. 60/785 |
| 5,557,918 A | 9/1996 | Chyou et al. |
| 5,581,996 A | 12/1996 | Koch |
| 5,749,218 A * | 5/1998 | Cromer et al. ................ 60/796 |
| 5,782,076 A | 7/1998 | Huber |
| 5,839,283 A | 11/1998 | Dobbeling |
| 6,065,282 A | 5/2000 | Fukue |
| 6,089,010 A | 7/2000 | Gross |
| 6,164,058 A | 12/2000 | Dobbeling et al. |
| 6,305,155 B1 | 10/2001 | Gross |
| 6,564,555 B2 | 5/2003 | Rice et al. |
| 6,672,070 B2 | 1/2004 | Bland |
| 6,672,072 B1 | 1/2004 | Giffin |
| 6,691,503 B2 | 2/2004 | Tiemann |
| 7,062,918 B2 | 6/2006 | Walker et al. |
| 7,600,370 B2 | 10/2009 | Dawson |
| 7,669,425 B2 * | 3/2010 | Liang .............................. 60/806 |
| 7,909,300 B2 * | 3/2011 | Kidder et al. .............. 248/346.5 |
| 8,015,824 B2 | 9/2011 | Vedhagiri |
| 8,082,738 B2 | 12/2011 | Cornelius et al. |
| 8,171,716 B2 | 5/2012 | West et al. |
| 8,381,532 B2 * | 2/2013 | Berry et al. .................... 60/795 |
| 2002/0174657 A1 | 11/2002 | Rice et al. |
| 2007/0234737 A1 | 10/2007 | Vosberg |
| 2008/0050218 A1 | 2/2008 | Sokhey |
| 2008/0098749 A1 | 5/2008 | Liang |

FOREIGN PATENT DOCUMENTS

| | | |
|---|---|---|
| CN | 1076014 A | 9/1993 |
| CN | 1088151 C | 7/2002 |
| EP | 0076668 B1 | 8/1986 |
| EP | 0417433 A1 | 3/1991 |
| EP | 0995066 A1 | 4/2000 |
| JP | 2001500942 A | 1/2001 |

OTHER PUBLICATIONS

Lefebvre, "Gas Turbine Combusion", CRC Press, Sep. 1, 1998, p. 71-93.

Unofficial English translation of CN Office Action issued in connection with corresponding CN Application No. 201010244303.X on Oct. 29, 2013.

Japanese Office Action for related Japanese Application No. 2010-163471, dated Mar. 11, 2014, pp. 1-7.

* cited by examiner

SYSTEMS AND METHODS FOR A GAS TURBINE COMBUSTOR HAVING A BLEED DUCT

BACKGROUND OF THE INVENTION

The subject matter disclosed herein relates to gas turbine combustors and diffusers.

Gas turbines typically include a diffuser that decelerates the air emitted from the compressor prior to the air entering the combustor to reduce combustion system pressure loss and improve engine efficiency. Packaging considerations including engine size, weight, and cost often result in the optimum diffusers having relatively short lengths. Some diffusers achieve a short length by bleeding air from the air stream near the diffuser throat to energize the air flow near the diffuser wall and prevent separation of the flow from the wall and aerodynamic instability.

BRIEF DESCRIPTION OF THE INVENTION

According to one aspect of the invention, a gas turbine system comprising, a diffuser operative to diffuse an airstream output from a compressor, a fuel nozzle operative to receive fuel and emit the fuel in a combustor, and at least one bleed duct operative to direct bleed air from down stream of the combustor to the fuel nozzle.

According to another aspect of the invention, a method for routing bleed air comprises outputting an airstream of compressed air from a compressor, drawing bleed air from the airstream down stream from the combustor, and directing the bleed air through a duct to a fuel nozzle.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification.

The foregoing and other features, and advantages of the invention are apparent from the following detailed description taken in conjunction with the accompanying drawings in which.

The detailed description explains embodiments of the invention, together with advantages and features, by way of example with reference to the drawings.

DETAILED DESCRIPTION OF THE INVENTION

Figure 1:
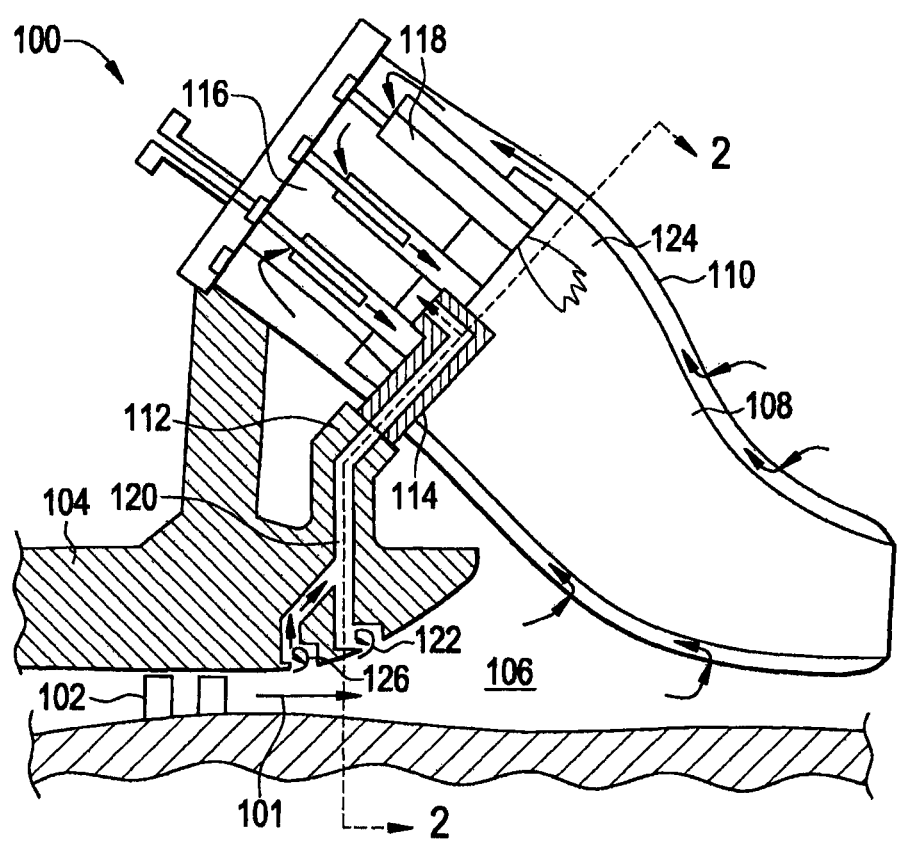
FIG. 1 is a side partially cut-away view of a portion of a gas turbine engine.

FIG. 1 illustrates a side partially cut-away view of a portion of a gas turbine engine 100. The gas turbine engine 100 includes a compressor portion 102, an outer casing 104, a diffuser portion 106, a transition piece 108, an impingement sleeve 110, a mount portion 112 connected to the outer casing 104, a bracket portion 114 connected to the mount portion 112, a head end volume 116 partially defined by the transition piece 108, a plurality of fuel nozzles 118 communicative with the head end volume 116, and a bleed air duct 120.

In operation, the compressor portion 102 compresses air in an airflow path indicated by the arrow 101. The airflow path flows into the diffuser portion 106. The diffuser portion reduces the velocity of the compressed air by increasing the cross-sectional area of the airflow path. A portion of the compressed air contacts the impingement sleeve 110 and flows along the outer surface of the transition piece 108. The flow of air along the outer surface of the transition piece 108 cools the transition piece 108, and enters the head end volume 116.

The bleed air duct 120 draws bleed air from the airflow path via a vortex cavity 122. The bled air increases the effectiveness of the diffuser portion 106 by improving the diffuser pressure-recovery coefficient. The arrangement of the impingement sleeve 110 in the airflow path induces a low driving pressure that improves the ducting of bleed air into the bleed air duct 120. The bleed air is routed into the head end volume 116.

The bleed air and the transition piece 108 cooling air mix in the head end volume 116 and enters the fuel nozzles 118. The air mixes with fuel and is discharged from the fuel nozzles 118 into the combustion chamber 124 where the fuel air mixture is ignited. The arrangement provides the bleed extraction for boundary layer control and efficiency, low pressure loss operation of the diffuser, and routes the bleed air to the fuel nozzles upstream of the first turbine rotor stage. This arrangement and sequence allows the air to be used for pre-mixing with fuel, lowering the emission of nitrogen oxides, and also avoids injection of the bleed air downstream of the first turbine rotor, increasing output and efficiency relative to a downstream air return arrangement.

Routing the bleed air to the fuel nozzles increases the efficiency of the engine and decreases undesirable emissions since the air removed from the air stream is used in the combustion of fuel. Previous systems and methods routed the bleed air down stream from the compressor, which may reduce output performance and efficiency and increase exhaust pollution levels.

The illustrated embodiment shows the bleed air duct 120 routed through the outer casing 104, the mount 112, and the bracket 114. The use of the outer casing 104, the mount 112, and the bracket 114 to define the bleed air duct 120 decreases the packaging area in the gas turbine 100. Alternate embodiments may include a second vortex cavity 126 that is operative to draw additional bleed air, and rout the bleed air to the bleed air duct 120. Other alternate embodiments may include any number of vortex cavities that draw bleed air into the bleed air duct 120.

Figure 2:
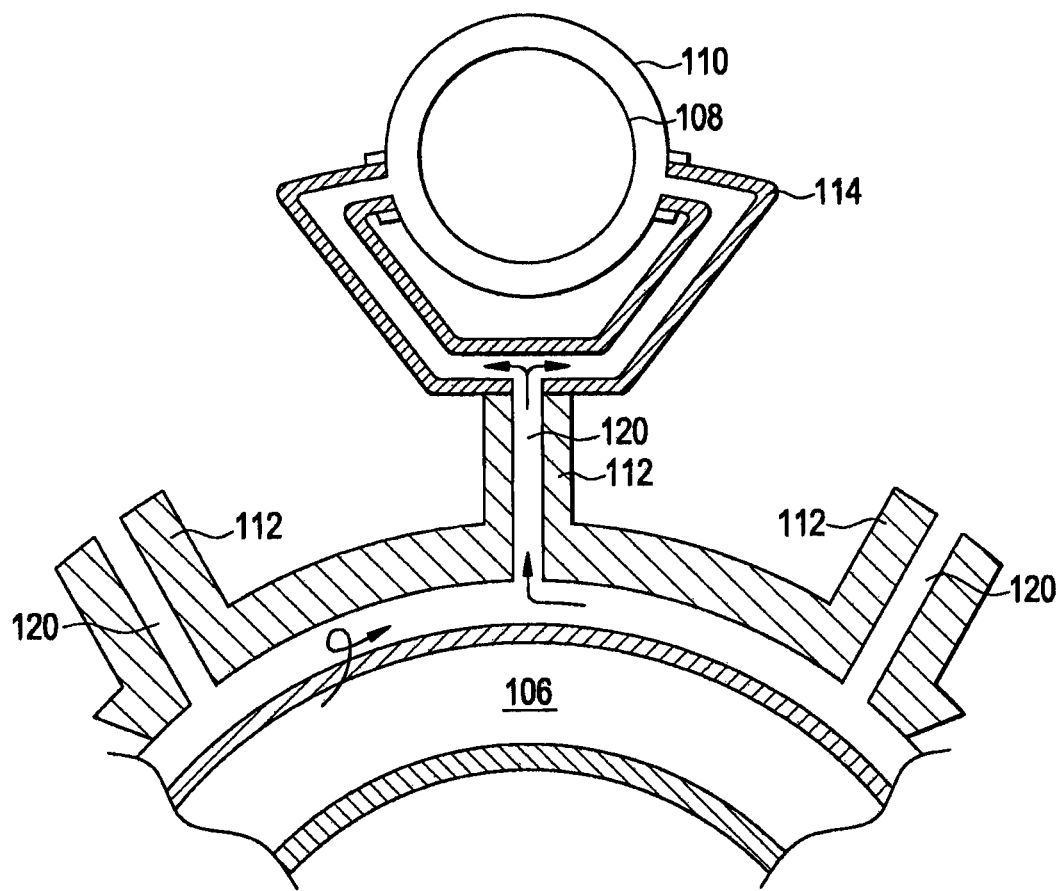
FIG. 2 is a front partially-cut away view of the gas turbine engine along the line A-A of FIG. 1.

FIG. 2 illustrates a front partially-cut away view of the gas turbine engine along the line A-A (of FIG. 1). FIG. 2 shows the bleed air duct 120 partially defined by the bracket 114 having a Y-shape. The bracket 114 supports the transition piece 108. Other embodiments may include a bracket having a single bleed air duct 120 path as opposed to a Y-shaped duct.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A gas turbine system comprising:
a compressor operative to output an airstream;

a diffuser having an inlet to receive the airstream and an outlet to output the airstream, the outlet having an area larger than the inlet to diffuse the airstream;

a fuel nozzle operative to receive fuel and emit the fuel in a combustor;

at least one bleed duct having a first and a second inlet between the compressor and the outlet of the diffuser, the second inlet located upstream of the first inlet, and the at least one bleed duct operative to direct bleed air from downstream of the compressor directly to the fuel nozzle;

a first vortex cavity at the first inlet of the bleed duct operative to draw compressed air from the at least one airstream in the diffuser; and a second vortex cavity at the second inlet, the first and second vortex cavities arranged such that bleed air from each of the first and second vortex cavities flows into the same bleed duct prior to flowing to the fuel nozzle.

2. The system of claim 1, wherein the system further comprises an outer casing that defines the diffuser, and the first vortex cavity is a recess in the outer casing.

3. The system of claim 1, wherein the first vortex cavity is located between the inlet and the outlet of the diffuser.

4. The system of claim 1, wherein the system further comprises an outer casing that defines the diffuser, and the at least one bleed duct passes through the outer casing.

5. The system of claim 1, wherein the fuel nozzle is partially disposed in a cavity, the cavity operative to receive the bleed air and rout bleed air to the fuel nozzle.

6. The system of claim 1, wherein the system further comprises an impingement sleeve operative to induce a driving pressure on the airstream.

7. The system of claim 1, wherein the first vortex cavity is located up stream of the diffuser.

8. The system of claim 1, wherein the system further comprises an outer casing that defines the diffuser, the at least one bleed duct passes through the outer casing to the fuel nozzle, and the airstream flows out from the outlet of the diffuser to the fuel nozzle.

9. The gas turbine system of claim 1, wherein the bleed duct has a volume less than a volume of the diffuser.

10. The gas turbine system of claim 1, wherein the diffuser has a substantially annular cross-sectional shape, and the bleed duct comprises a channel extending substantially radially from the substantially annular cross-sectional shape of the diffuser.

11. The gas turbine system of claim 1, wherein the airstream output from the diffuser is directed to the fuel nozzle to be mixed with fuel and combusted in the combustor.

12. The gas turbine system of claim 1, wherein the at least one bleed duct and the diffuser are configured such that bleed air output from the at least one bleed duct is mixed with the airstream output from the diffuser upstream of the fuel nozzle.

13. A method for routing bleed air comprising:

outputting an airstream of compressed air from a compressor;

diffusing the airstream in a diffuser;

directing the bleed air through a bleed duct directly to a fuel nozzle, the bleed duct comprising a first inlet and a second inlet located upstream of the first inlet;

drawing, with a first vortex cavity located at the first inlet upstream from an outlet of the diffuser, bleed air from the airstream downstream from the compressor and upstream from the outlet of the diffuser;

drawing, with a second vortex cavity located at the second inlet of the bleed duct, bleed air from the airstream downstream from the compressor; and combining the bleed air from the first vortex cavity with the bleed air from the second vortex cavity.

14. The method of claim 13, wherein the bleed air is drawn from the airstream by the first vortex cavity located in the diffuser.

15. The method of claim 13, wherein a driving pressure is induced on the air stream by an impingement sleeve.

16. The method of claim 13, further comprising:

directing the airstream from the diffuser along an impingement sleeve to the fuel nozzle.

* * * * *